May 13, 1952 R. K. WAGONER 2,596,313
DOUGH SHAPING MACHINE
Filed Oct. 17, 1947 3 Sheets-Sheet 2

R. K. Wagoner
INVENTOR
BY
ATTORNEYS.

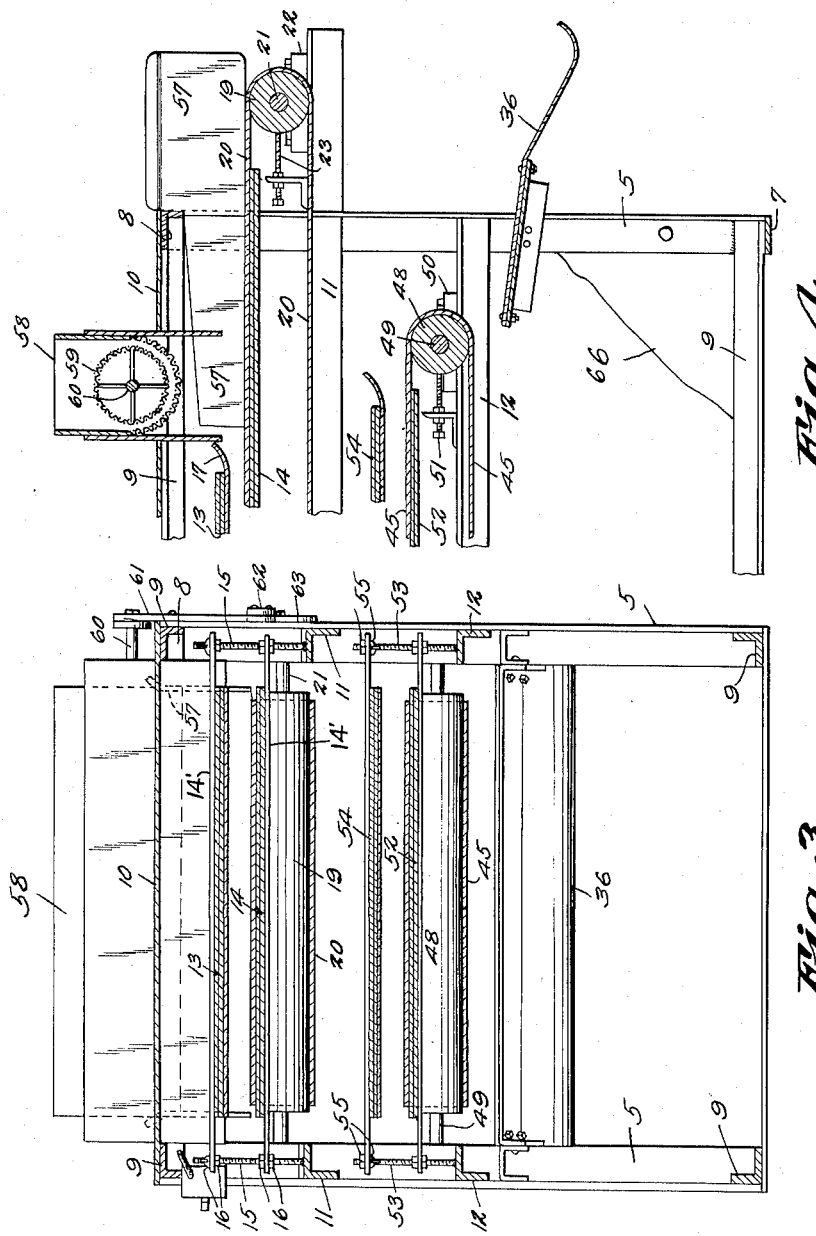

Patented May 13, 1952

2,596,313

UNITED STATES PATENT OFFICE 2,596,313

DOUGH SHAPING MACHINE

Roscoe K. Wagoner, Evansville, Ind.; Sophia V. Wagoner, administratrix of said Roscoe K. Wagoner, deceased Application October 17, 1947, Serial No. 780,464

1 Claim. (Cl. 107—9)

This invention relates to a machine designed for shaping dough into proper shape for making long rolls commonly used in wiener for frankfurter sandwiches, the primary object of the invention being to provide a machine which will greatly increase the production of these rolls or buns, and at the same time provide rolls and buns which are of uniform shapes and sizes.

An important object of the invention is to provide a machine of this character wherein the dough used in forming the roll or bun, will be fed into the machine at the front end thereof, the dough passing through the machine and being delivered to the operator at the front of the machine, thereby providing a one-man operated machine.

Another object of the invention is to construct a machine for forming dough into rolls or buns which will be exceptionally small and light, the machine beng designed for mounting on a work bench and moved from one location to another with the minimum amount of effort, the operation of the machine being carried out by merely plugging in an electric wire to an electric outlet in circuit with the usual house circuit.

Still another object of the invention is to provide means whereby the portion of the dough to be formed into the roll or bun, will be rolled through the machine, means being provided for controlling the size of the roll delivered for baking.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 3 is a sectional view taken on line 3—3 of Figure 1.

Figure 4 is a sectional view taken on line 4—4 of Figure 2.

Figure 1:
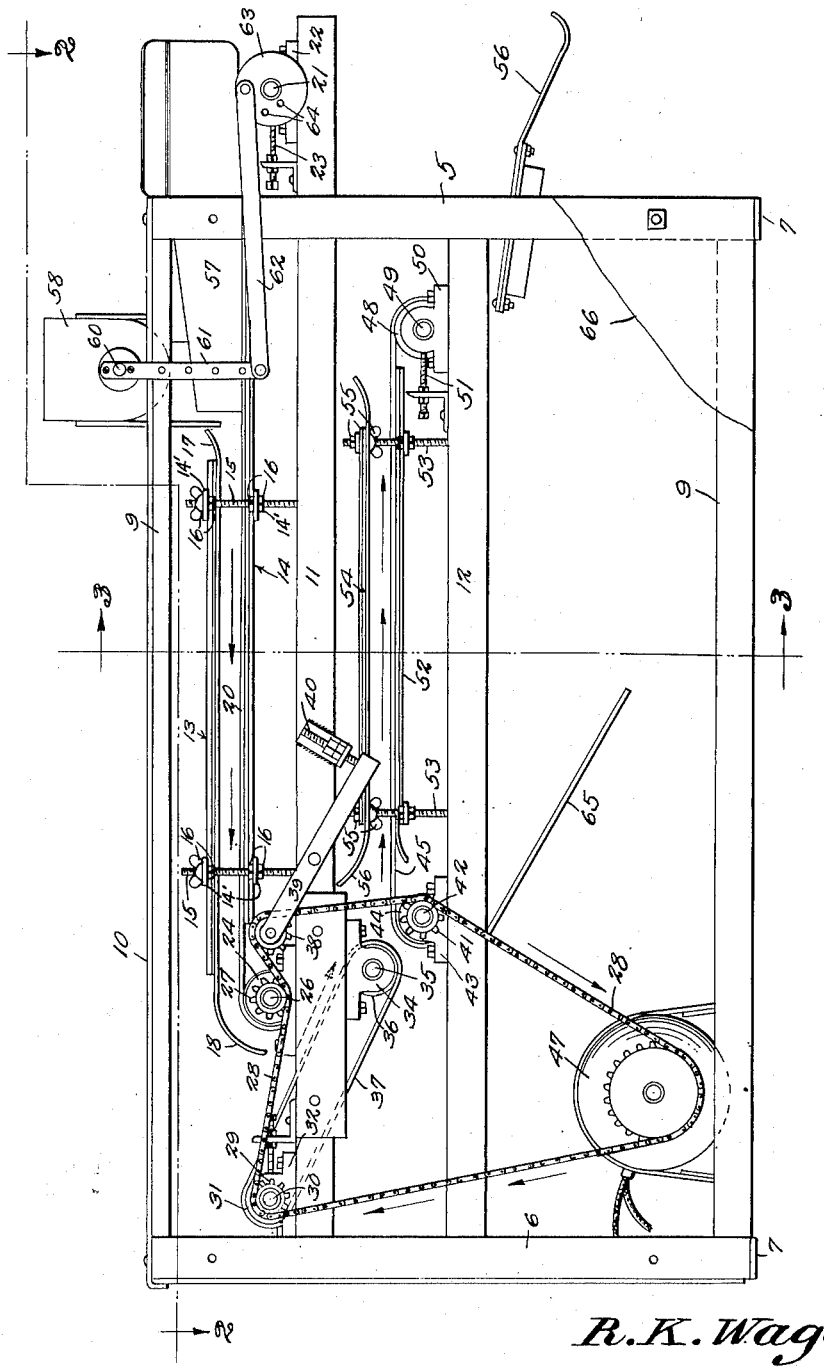
Figure 1 is a side elevational view of a roll or bun forming machine, constructed in accordance with the invention.
Figure 2:
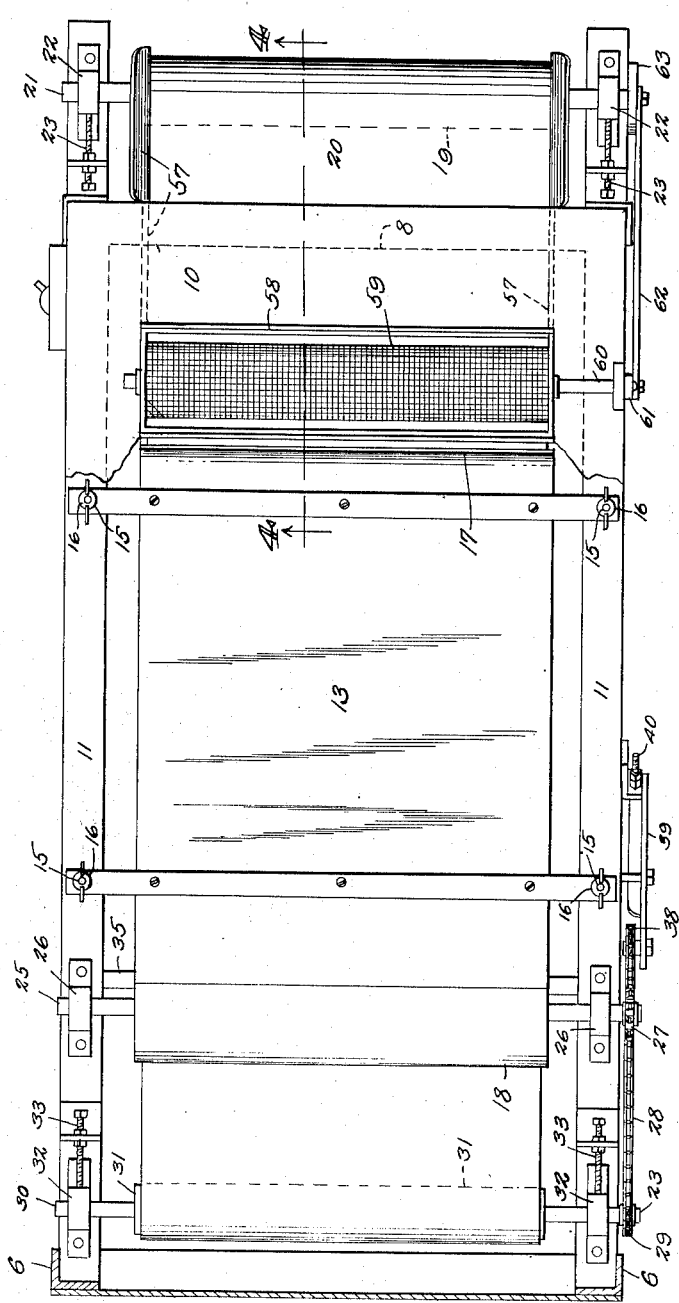
Figure 2 is a sectional view taken approximately on line 2—2 of Figure 1.

Referring to the drawings in detail, the frame of the machine is constructed preferably of angle-bar material and comprises spaced front and rear posts 5 and 6 respectively, the front and rear posts of each pair being connected by means of the lower bars 7, the upper ends of the posts being connected by means of the transverse bars 8. Longitudinally spaced angle bars 9 connect the front and rear posts.

The reference character 10 indicates the cover plate that connects the longitudinally spaced angle bars 9 and covers the upper section of the machine.

Arranged in parallel vertical spaced relation with respect to each other and secured within the frame of the machine, are angle bars 11 and 12, the angle bars 11 providing a pair of supports for the presser plates 13 and 14 to which are secured transverse bars 14', the ends of which are provided with openings to receive the threaded rods 15 on which the adjusting nuts 16 are positioned, the adjusting nuts being disposed on opposite sides of the presser plates 13 and 14, so that these presser plates may be raised and lowered to meet various requirements in the size of the finished roll or bun formed by the machine. The forward end of the presser plate 13 is curved upwardly at 17 so that the dough will be fed under the plate without damaging the roll. The opposite end of the plate 13 is curved downwardly at 18, for purposes to be hereinafter more fully described.

The reference character 19 indicates a roller or pulley over which the endless belt or conveyor 20 operates, the roller or pulley 19 being provided with a shaft 21 that operates in bearings 22 that in turn are mounted in the angle bars 11, adjusting screws 23 being provided for adjusting the roller or pulley 19 to maintain the belt or conveyor 20 taut at all times.

This belt or conveyor 20 also operates over the roller 24 at the opposite end of the machine, which roller 24 is provided with a shaft 25 that operates in bearings 26, also mounted on the angle bars 11.

This shaft 25 is provided with a sprocket 27 secured to one end thereof, which sprocket engages the chain 28 that also moves over the sprocket 29 secured to one end of the shaft 30 on which the roller 31 is secured, the shaft 30 being mounted in the bearings 32 which are adjustable by means of the adjusting screws 33.

Supported under the bars 11 are bearings 34 in which the shaft 35 operates, the shaft 35 providing a support for the roller 36, over which the endless conveyor 37 operates, the conveyor 37 also operating over the roller 31. This endless conveyor 37 is so disposed with respect to the endless conveyor 20, that rolls moving under the plate 13 will be directed downwardly by the curved end 18 of the plate 13, and be deposited on the endless conveyor 37.

An idle sprocket 38 is mounted on the pivoted arm 39, mounted on the frame of the machine, and this pivoted arm 39 is adjustable by means of the screw 40, which engages the lower end of the arm. Thus it will be seen that due to this construction, the chain 28 which operates over the idle sprocket 38, will be held taut.

The chain 28 also operates over the sprocket 41 secured to one end of the shaft 42 mounted in bearings 43, that in turn are secured to the upper surface of the angle bars 12. Secured to the shaft 42 is a roller 44 over which the endless conveyor 45 operates, the roller receiving its motion from the motor 47 mounted within the frame of the machine, through the chain 28 and sprockets 41.

The endless conveyor 45 also operates over the roller 48 secured to the shaft 49 that operates in bearings 50 mounted on the angle bars 12 adjacent to the front end of the machine. Adjusting screw 51 cooperates with the bearings in moving the bearings to maintain the endless conveyor 45 taut.

The endless conveyor 45 moves over the supporting plate 52 that is vertically adjustable on the supporting screws 53 that are secured to the lower angle bars 12.

Above the supporting plate 52 is a vertically adjustable presser plate 54, which is formed with openings to receive the screw 53, the adjusting nuts 55 being provided on opposite sides of the plate 54 for supporting the plate in its positions of vertical adjustment.

The rear end of the plate 54 is curved upwardly as at 56 to direct the rolls or buns between the plate 54 and endless conveyor 45.

As shown by Figure 1 of the drawings, the endless conveyor 37 is so arranged that the lower portion thereof will direct buns onto the endless conveyor 45, where they will be carried through to the forward end of the machine and delivered onto the finished roll or bun tray 56, where they may be removed by the operator and transferred to the oven for baking.

The dough to be formed into the rolls is fed to the machine through the trough 57, which overlies the belt or conveyor 20 at the forward end of the machine, the trough being so arranged that the operator may place the dough which has been partially formed, directly onto the belt or conveyor 20 without danger of the dough passing laterally from the belt or conveyor 20.

Directly above the inner end of the trough 57, is a hopper 58 which is formed with an open bottom to permit flour contained in the foraminous drum 59, which oscillates therein, to be delivered onto the rolls or buns, the drum having a shaft 60 to which one end of the arm 61 is connected, the arm 61 having pivotal connection with the link 62, that in turn has pivotal connection with the disc 63 secured to one end of the shaft 21. Thus it will be seen that as the disc 63 rotates, the link 62 will be reciprocated, locking the arm 61 to cause flour contained within the hopper 58, to be screened and delivered directly onto the buns or rolls, and endless conveyor 20.

A number of openings 64 are provided in the disc 63 and afford means whereby the stroke of the link 62 may be adjusted, regulating the movement of the drum 59.

From the foregoing it will be seen that due to the construction shown and described, I have provided a machine for forming dough into rolls or buns which are especially designed for use in making wiener or frankfurter sandwiches, the operation of the machine being such that the dough rolling through the machine will be accurately formed into long rolls.

It might be further stated that a motor shield indicated by the reference character 65 is provided within the machine to protect the motor from flour or other foreign matter.

The entire frame may be closed by means of plates, such as indicated at 66, to protect the bearings and shafts against foreign matter.

In view of the foregoing disclosure it is believed that the operation and structure of the machine will be apparent and that further description as to the operation of the machine is unnecessary.

Having thus described the invention, what is claimed is:

A machine for forming portions of dough into finger rolls, comprising a frame including horizontal side angle bars, an upper endless conveyor operating through the frame in a horizontal plane, a lower endless conveyor operating within the frame in parallel relation with the upper conveyor, presser plates disposed above and in vertical spaced relation with the upper flights of the endless conveyors disposed longitudinally thereof, the side edges of the presser plates extending beyond the side edges of the endless conveyors, transverse bars secured to the upper surface of each presser plate, said bars having openings disposed adjacent to the ends thereof, vertical adjusting screws adjusting the normal positions of the presser plates with respect to the conveyors, said screws extending through the openings in the extended ends of the transverse bars, the lower ends of said adjusting screws resting on said angle bars, means for securing the presser plates to said adjusting screws adjusting said presser plates as the screws are rotated, an inclined endless conveyor operating within the frame between the upper and lower endless conveyors adjacent to one of the adjacent ends thereof and onto which formed rolls are delivered from the upper endless conveyor to the lower endless conveyor, means for operating the endless conveyors, and means for receiving the formed rolls from the lower endless conveyor after they have been pressed into form by the presser plates.

ROSCOE K. WAGONER.

REFERENCES CITED

The following references are of record in the file of this patent:

UNITED STATES PATENTS

| Number | Name | Date |
| --- | --- | --- |
| 871,644 | Smith | Nov. 19, 1907 |
| 889,465 | Keller et al. | June 2, 1908 |
| 1,800,417 | Van Houten | Apr. 14, 1931 |
| 1,895,634 | Lauterbur et al. | Jan. 31, 1933 |
| 2,323,537 | Harber | July 6, 1943 |